United States Patent
Maru et al.

(10) Patent No.: US 10,514,263 B2
(45) Date of Patent: Dec. 24, 2019

(54) NAVIGATION DEVICE, ROUTE SEARCH SERVER, AND ROUTE SEARCH METHOD

(71) Applicant: Clarion Co., Ltd., Saitama-shi, Saitama (JP)

(72) Inventors: Mitsunori Maru, Tokyo (JP); Takaaki Sekiguchi, Tokyo (JP); Shinichi Amaya, Saitama (JP); Arata Hayashi, Saitama (JP)

(73) Assignee: CLARION CO., LTD., Saitama-Shi (JP)

( * ) Notice: Subject to any disclaimer, the term of this patent is extended or adjusted under 35 U.S.C. 154(b) by 24 days.

(21) Appl. No.: 15/888,701

(22) Filed: Feb. 5, 2018

(65) Prior Publication Data
US 2018/0238697 A1    Aug. 23, 2018

(30) Foreign Application Priority Data
Feb. 22, 2017   (JP) ................ 2017-030627

(51) Int. Cl.
*G01C 21/34*    (2006.01)
*G01C 21/36*    (2006.01)

(52) U.S. Cl.
CPC ....... *G01C 21/3461* (2013.01); *G01C 21/362* (2013.01)

(58) Field of Classification Search
CPC ................................ G01C 21/3461
See application file for complete search history.

(56) References Cited

U.S. PATENT DOCUMENTS

| 5,910,177 A * | 6/1999 | Zuber | G01C 21/3658 |
| | | | 701/410 |
| 2004/0202111 A1 * | 10/2004 | Beshai | H04L 45/00 |
| | | | 370/237 |

(Continued)

FOREIGN PATENT DOCUMENTS

| EP | 0 846 933 A2 | 6/1998 |
| EP | 1 471 329 A2 | 10/2004 |
| JP | 2001-330459 A | 11/2001 |

OTHER PUBLICATIONS

Extended European Search Report dated Aug. 7, 2018 in the European Patent Application No. 18154897.5.

*Primary Examiner* — Alex C Dunn
(74) *Attorney, Agent, or Firm* — Foley & Lardner LLP

(57) ABSTRACT

The present invention performs route guidance that excludes a difficult-to-travel section appropriately and provides an alternative route with favorable route quality. A navigation device 200 includes an arithmetic device 204 that, when a route including a difficult-to-travel section is found, identifies the route as a candidate route while adding a predetermined penalty cost to the cost of the route, identifies an alternative route obtained by coupling a first partial route from a constituent node in the difficult-to-travel section of the found route to a destination with a second partial route from the departure point of the found route to a node having already been searched for, identifies the alternative route as a candidate route after adding a coupling cost for reaching from the already-searched node to the certain constituent node in the difficult-to-travel section to costs of the first and second partial routes, selects one of the candidate route with the penalty cost and the candidate route with the coupling cost with the smaller cost as a guidance route.

10 Claims, 14 Drawing Sheets

(56) References Cited

U.S. PATENT DOCUMENTS

| | | | |
|---|---|---|---|
| 2004/0215389 A1* | 10/2004 | Hirose | G01C 21/3461 701/410 |
| 2010/0332132 A1* | 12/2010 | Okude | G01C 21/3476 701/414 |
| 2015/0039219 A1* | 2/2015 | Yamaki | G01C 21/3461 701/400 |
| 2015/0153189 A1 | 6/2015 | Kim | |
| 2016/0298976 A1* | 10/2016 | Sato | G08G 1/096827 |

* cited by examiner

| CANDIDATE ROUTE ID | COST | DIFFICULT-TO-TRAVEL SECTION PASSAGE FLAG | ROUTE LENGTH | AUTONOMOUS DRIVING SECTION LENGTH | ON-ROUTE LINK COUNT | ON-ROUTE LINK ID SEQUENCE ||||
|---|---|---|---|---|---|---|---|---|---|
| 1 | 50000 | 1 | 19km | 5km | 30 | 1505 | 1504 | 1502 | ... |
| 2 | 35000 | 0 | 16km | 3km | 25 | 900 | 901 | 902 | ... |
| 3 | 40000 | 0 | 18km | 4km | 40 | 2001 | 1001 | 1000 | ... |
| 4 | 32000 | 0 | 20km | 10km | 20 | 10 | 15 | 17 | ... |
| 5 | 60000 | 0 | 25km | 11km | 45 | 500 | 550 | 560 | ... |
| ... | ... | ... | ... | ... | ... | ... | ... | ... | ... |

FIG. 10

NAVIGATION DEVICE, ROUTE SEARCH SERVER, AND ROUTE SEARCH METHOD

CROSS-REFERENCE TO RELATED APPLICATION

This application claims priority pursuant to 35 U.S.C. § 119 from Japanese Patent Application No. 2017-30627, filed on Feb. 22, 2017, of which is incorporated herein by reference.

BACKGROUND

Technical Field

The present invention relates to a navigation device, a route search server, and a route search method, and relates specifically to a technology for performing route guidance that excludes a difficult-to-travel section appropriately and provides an alternative route with favorable route quality.

Related Art

There is known an automotive navigation system (hereinafter referred to simply as a navigation system) that guides a driver by displaying, on a screen, an estimated current location of a host vehicle on a road map, a route leading to a destination, and other information.

Such a navigation system typically sets a route by using digital map data (hereinafter referred to as map data) which handles roads as links and intersections as nodes, and calculating a route with the smallest sum of link costs, such as time, distance, and fuel consumption for a travel from the departure point to the destination. Such a function is known as a route search function, and Dijkstra's algorithm or similar algorithms are widely used to implement this route search function.

Information on a route found by a navigation system is used for guidance of a driver using screen-display and/or voice message, and is also expected to be used for control of an autonomous vehicle autonomously driving to the destination. Thus, what is important is the safely for the vehicle in travelling the actual roads by following the found route.

Meanwhile, a conventional navigation system sometimes finds a route that includes a section that is difficult to travel in an actual road (such a section is hereinafter referred to as a difficult-to-travel section). An example thereof is a route including a section where the vehicle should merge into the far left lane of a multilane road, make multiple lane changes to move to the far right lane while traveling a short distance to the next intersection, and then make a right turn at the next intersection. Such a route is not preferable since the safety may be impaired in terms of both the guidance of the driver and the control of the autonomous vehicle.

As a conventional technology for setting a guidance route without including a route that requires unsafe lane change (i.e., a difficult-to-travel route), there is proposed, for example, a route setting device comprising a route setting unit that sets a guidance route from a departure point to a destination based on link information on links which couple nodes and coupling information on coupling between the links, the route setting unit being capable of setting the guidance route without including a difficult-to-travel route which is a route including a coupling point to a link with two lanes in each direction and a right-turn, left-turn, or divergence point ahead of the coupling point, and having a calculation value not satisfying a predetermined determination condition, the calculation value obtained based at least on the distance from the coupling point to the right-turn, left-turn, or divergence point and on the number of lane changes required while travelling that distance (see Japanese Patent Application Publication No. 2001-330459).

SUMMARY OF THE INVENTION

The conventional technology uses Dijkstra's algorithm or similar algorithms to set a relatively high cost on each route including a difficult-to-travel section, thereby lowering the possibility that a route including a difficult-to-travel section is presented.

Dijkstra's algorithm or similar algorithms, however, have the following problem. Specifically, by these algorithms, a navigation system repeats selecting a node with the smallest cost among undetermined nodes and determining the cost of the node and a route from the departure point to the node. As a result, many nodes are determined by the time a difficult-to-travel section is detected in a route. Therefore, if the route is avoided after the detection of the difficult-to-travel section therein, there remain only a limited variety of candidate routes to be an alternative route (the candidate routes are candidates until a final guidance route is selected). As a result, an alternative route selected as a guidance route may include a roundabout route and may not be a proper route.

The present invention has been made in view of the above problem for the purpose of providing a technology for performing route guidance that excludes a difficult-to-travel section appropriately and provides an alternative route with favorable route quality.

To solve the above problem, a navigation device of the present invention is a navigation device that performs route search to find candidate routes each having a plurality of nodes from a departure point to a destination, manages costs of the respective candidate routes, and selects a guidance route from the candidate routes based on the costs, the navigation device comprising a route search unit that, when a first candidate route including a difficult-to-travel section is found, manages, as the cost of the first candidate route, a sum of a predetermined penalty cost and the original cost of the first candidate route, identifies, as a second candidate route, an alternative route obtained by coupling a first partial route with a second partial route, the first partial route extending from a first node in the difficult-to-travel section included in the first candidate route to the destination, the second candidate route extending from the departure point of the first candidate route to a second node which neighbors the first node, manages, as the cost of the second candidate route, a sum of a cost of the first partial route, a cost of the second partial route, and a coupling cost which is a cost for coupling the first partial route with the second partial route, compares the cost of the first candidate route with the cost of the second candidate route, and selects one of the first and second candidate routes with the smaller cost as the guidance route.

Further, a route search server of the present invention is a route search server that is coupled to a navigation device, performs route search to find candidate routes each having a plurality of nodes from a departure point to a destination, manages costs of the respective candidate routes, and selects a guidance route from the candidate routes based on the costs, the route search server comprising: a route search unit that, when a first candidate route including a difficult-to-travel section is found, manages, as the cost of the first candidate route, a sum of a predetermined penalty cost and the original cost of the first candidate route, identifies, as a second candidate route, an alternative route obtained by coupling a first partial route with a second partial route, the first partial route extending from a first node in the difficultto-travel section included in the first candidate route to the destination, the second candidate route extending from the departure point of the first candidate route to a second node which neighbors the first node, manages, as the cost of the second candidate route, a sum of a cost of the first partial route, a cost of the second partial route, and a coupling cost which is a cost for coupling the first partial route with the second partial route, compares the cost of the first candidate route with the cost of the second candidate route, and selects one of the first and second candidate routes with the smaller cost as the guidance route; and a route transmission unit that transmits information on the guidance route to the navigation device.

Further, a route search method of the present invention is a route search method performed by a navigation device that performs route search to find candidate routes each having a plurality of nodes from a departure point to a destination, manages costs of the respective candidate routes, and selects a guidance route from the candidate routes based on the costs, the route search method comprising, when a first candidate route including a difficult-to-travel section is found, managing, as the cost of the first candidate route, a sum of a predetermined penalty cost and the original cost of the first candidate route; identifying, as a second candidate route, an alternative route obtained by coupling a first partial route with a second partial route, the first partial route extending from a first node in the difficult-to-travel section included in the first candidate route to the destination, the second candidate route extending from the departure point of the first candidate route to a second node which neighbors the first node; managing, as the cost of the second candidate route, a sum of a cost of the first partial route, a cost of the second partial route, and a coupling cost which is a cost for coupling the first partial route with the second partial route; and comparing the cost of the first candidate route with the cost of the second candidate route and selecting one of the first and second candidate routes with the smaller cost as the guidance route.

Further, a route search method of the present invention is a route search method performed by a route search server that is coupled to a navigation device, performs route search to find candidate routes each having a plurality of nodes from a departure point to a destination, manages costs of the respective candidate routes, and selects a guidance route from the candidate routes based on the costs, the route search method comprising: when a first candidate route including a difficult-to-travel section is found, managing, as the cost of the first candidate route, a sum of a predetermined penalty cost and the original cost of the first candidate route; identifying, as a second candidate route, an alternative route obtained by coupling a first partial route with a second partial route, the first partial route extending from a first node in the difficult-to-travel section included in the first candidate route to the destination, the second candidate route extending from the departure point of the first candidate route to a second node which neighbors the first node; managing, as the cost of the second candidate route, a sum of a cost of the first partial route, a cost of the second partial route, and a coupling cost which is a cost for coupling the first partial route with the second partial route; comparing the cost of the first candidate route with the cost of the second candidate route and selecting one of the first and second candidate routes with the smaller cost as the guidance route; and transmitting information on the guidance route to the navigation device.

The present invention can perform route guidance that excludes a difficult-to-travel section appropriately and provides an alternative route with favorable route quality.

BRIEF DESCRIPTION OF THE DRAWINGS

FIG. 10 is a diagram illustrating an example of a candidate route management table.

DETAILED DESCRIPTION OF THE INVENTION

First Embodiment

Figure 1:
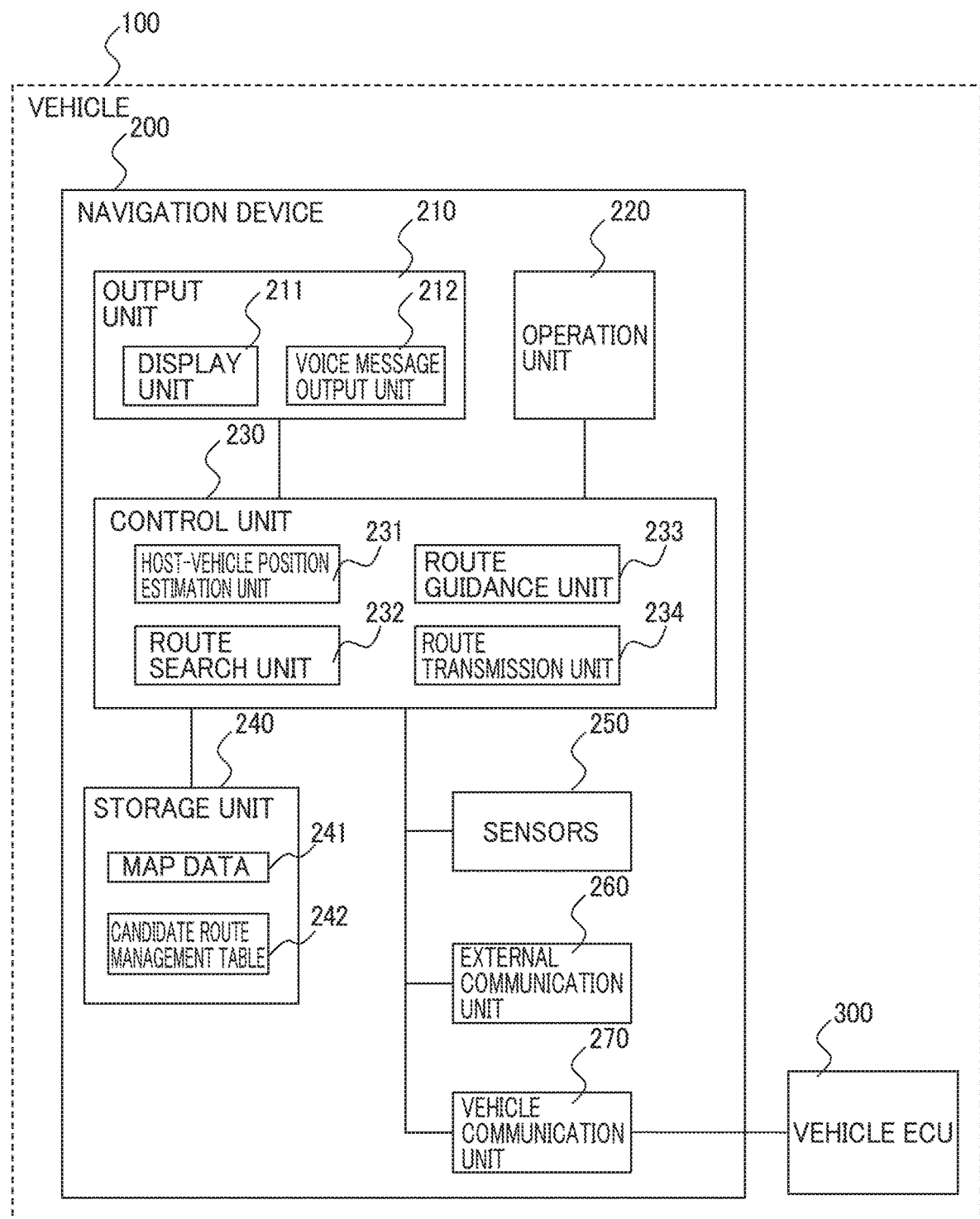
FIG. 1 is a diagram illustrating an example system configuration in the first embodiment.

Using the drawings, an embodiment of the present invention is described in detail below. FIG. 1 is a diagram illustrating an example system configuration according to the present embodiment. In the system configuration exemplified in FIG. 1, a navigation device 200 is installed in a vehicle 100. The navigation device 200 in such a configuration is a device that performs route guidance with excludes a difficult-to-travel section appropriately and provides an alternative route with favorable route quality. The navigation device 200 finds a route to a destination in response to a request from a driver and guides the driver or controls the vehicle 100 if the vehicle 100 is an autonomous vehicle, along the route to the destination.

The navigation device 200 exemplified in FIG. 1 is installed in the vehicle 100 operated by the driver. The vehicle 100 includes the navigation device 200 and a vehicle electronic control unit (ECU) 300 in addition to the mechanisms as a regular automobile.

The navigation device 200 includes an output unit 210, an operation unit 220, a control unit 230, a storage unit 240, sensors 250, an external communication unit 260, and a vehicle communication unit 270. The following describes how the navigation device 200 finds a route and guides the driver of the vehicle 100 along the route or transmits the route to the vehicle 100 as an autonomous vehicle.

First, a host-vehicle position estimation unit 231 of the control unit 230 estimates the position of the host vehicle using information acquired from the vehicle communication unit 270 and information acquired from the sensors 250 including a gyro sensor, an acceleration sensor, and an appropriate positioning sensor such as the Global Position System (GPS). Note that the vehicle communication unit 270 complies with standards such as control area network (CAN) standards.

If the driver of the vehicle 100 operates the operation unit 220 such as a touch panel to set a destination, then a route search unit 232 of the control unit 230 finds a route from the host-vehicle position estimated above to the destination.

This route search is implemented when the route search unit 232 uses map data 241 and an algorithm such as Dijkstra's algorithm. In this regard, the route search unit 232 of the control unit 230 may receive latest traffic information on the vicinity of the destination or roads leading to the destination or the like via the external communication unit 260 such as a Wi-Fi module and use the traffic information for the route search if necessary. Further, the map data 241 may include highly accurate road data that are being developed for the use in autonomous driving.

Based on the route information obtained by the route search, a route guidance unit 233 of the control unit 230 creates information for guiding the driver using screen display and/or voice messages, and outputs the information to the output unit 210 such as a display unit 211 (a display) and a voice message output unit 212 (a loudspeaker). If the vehicle 100 supports autonomous driving along a given route, a route transmission unit 234 transmits the route information obtained by the route search to the vehicle ECU 300 via the vehicle communication unit 270.

Figure 2:
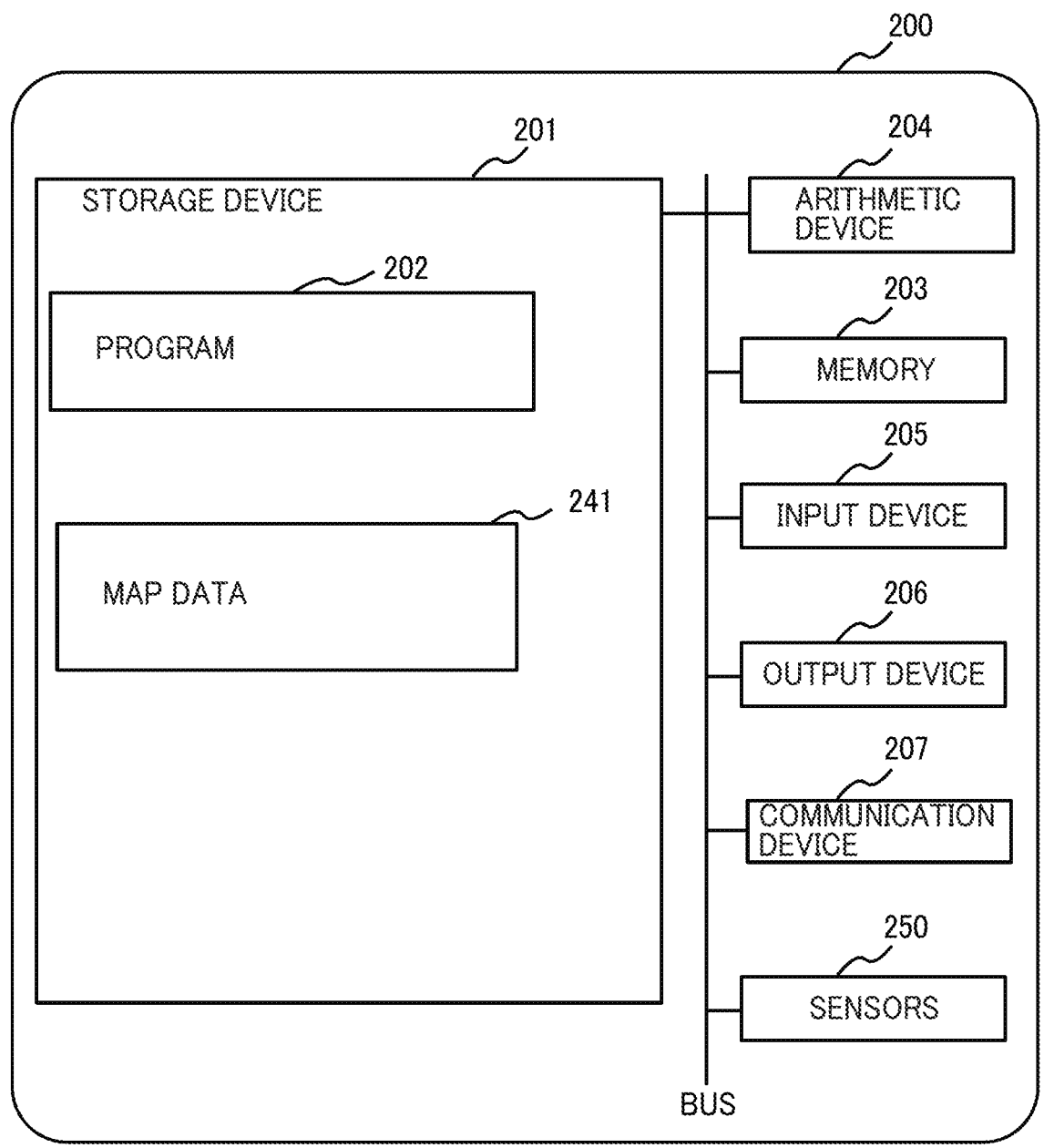
FIG. 2 is a diagram illustrating an example configuration of a navigation device in the first embodiment.

The hardware configuration of the navigation device 200 is, for example, as exemplified in FIG. 2. The navigation device 200 includes a storage device 201 formed by a suitable non-volatile storage device such as a solid-state drive (SSD) or a hard disk drive, a memory 203 formed by a volatile memory device such as a RAM, an arithmetic device 204 such as a CPU that performs overall control of the navigation device 200 by, for example, loading a program 202 stored in the storage device 201 into the memory 203 and executing the program 202, and also performs various determinations, computations, and control processing, an input device 205 that receives a touch input or a voice input from the driver (or a user), an output device 206 such as a display that displays processed data and a loudspeaker that outputs voice of processed data, and a communication device 207 that performs data communications with other devices via an appropriate communication channel.

In the configuration illustrated in FIG. 1, the output unit 210 is implemented by the output device 206, the operation unit 220 is implemented by the input device 205, the control unit 230 is implemented by the arithmetic device 204, the storage unit 240 is implemented by the storage device 201, and the external communication unit 260 and the vehicle communication unit 270 are implemented by the communication device 207. The storage device 201 stores therein at least the map data 241 and a candidate route management table 242 (described later) in addition to the program 202 for implementing functions necessary as the navigation device 200 of the present embodiment.

Figure 3A:
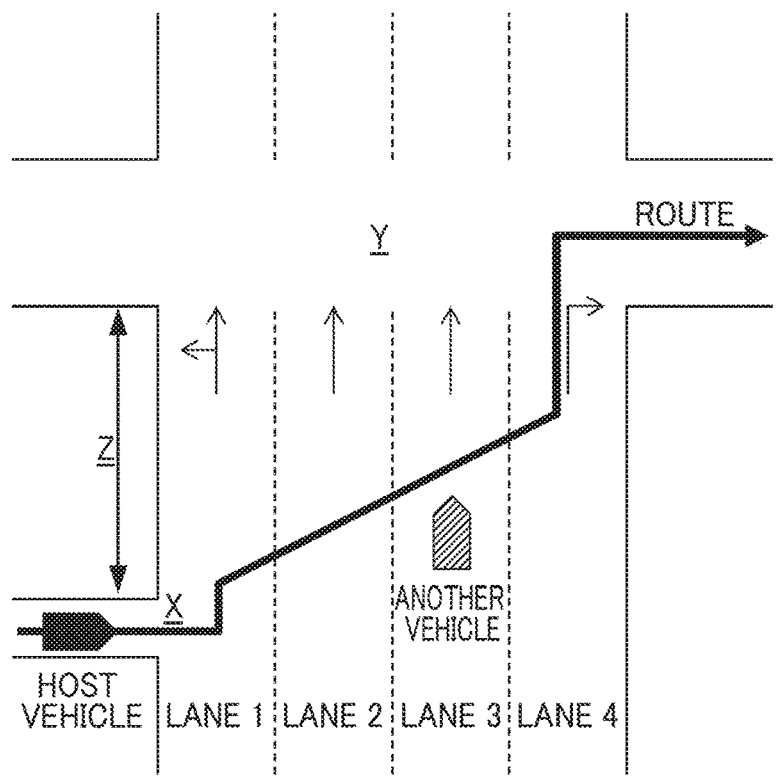
FIG. 3A is a diagram illustrating an example route including a difficult-to-travel section.
Figure 3B:
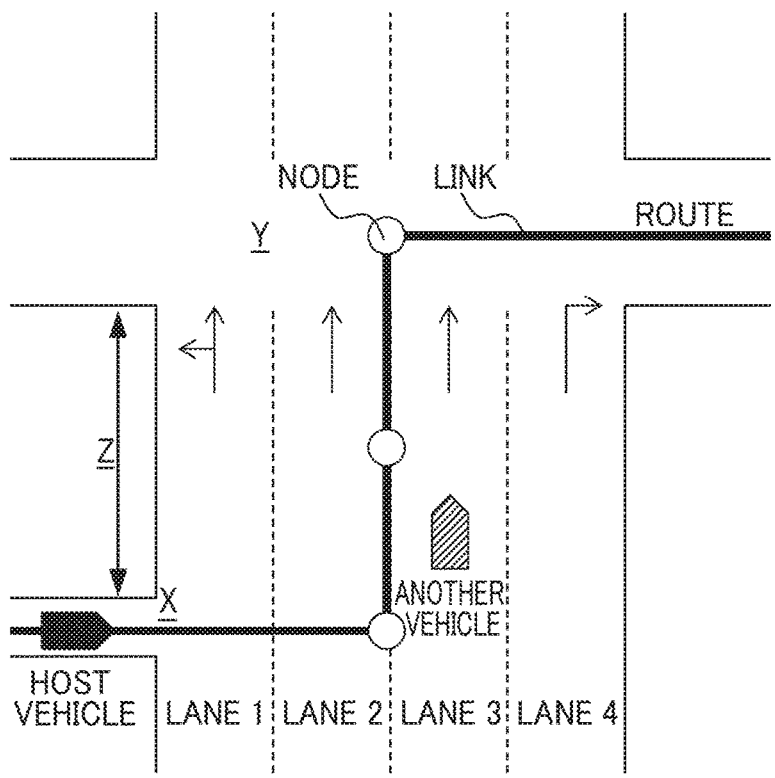
FIG. 3B is a diagram illustrating an example route including a difficult-to-travel section.

As shown in FIGS. 3A and 3B, a next description relates to a route including a difficult-to-travel section. In a situation assumed here and illustrated in FIG. 3A, the host vehicle is trying to make a left turn to merge into a main road with four lanes (lanes 1 to 4) in each direction. Then, in the route shown, the host vehicle enters the lane 1 of the main road and makes a right turn on the lane 4 at the nearest intersection Y. Thus, the host vehicle needs to make three lane changes in total before reaching the nearest intersection Y: from the lane 1 to the lane 2, from the lane 2 to the lane 3, and from the lane 3 to the lane 4. However, it is difficult to make the three lane changes when the distance Z from the point X of mergence into the main road to the nearest intersection Y is shorter than a predetermined standard. Moreover, if another vehicle is travelling on the main road, the host vehicle may collide with that vehicle by trying to change lanes forcibly, and it is therefore dangerous. Thus, it is necessary that a route like the one illustrated in FIG. 3A be avoided and not selected as a guidance route. More specifically, route search needs to find a route that the host vehicle does not pass the difficult-to-travel section formed by the links and nodes illustrated in FIG. 3B.

Based on the drawings, an actual procedure in a route search method according to the present embodiment is described. Each of various operations in the route search method described below is implemented by the program that the navigation device 200 loads into the memory or the like and executes. The program is formed by codes for performing the various operations described below.

Figure 4:
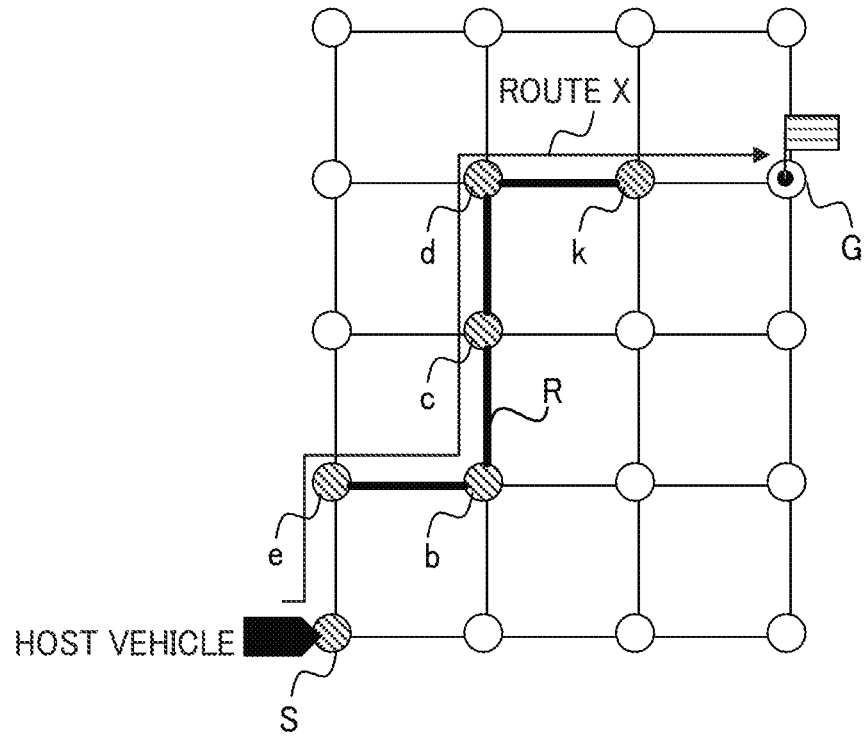
FIG. 4 is a diagram illustrating a route that is found by route search and includes a difficult-to-travel section.
Figure 5:
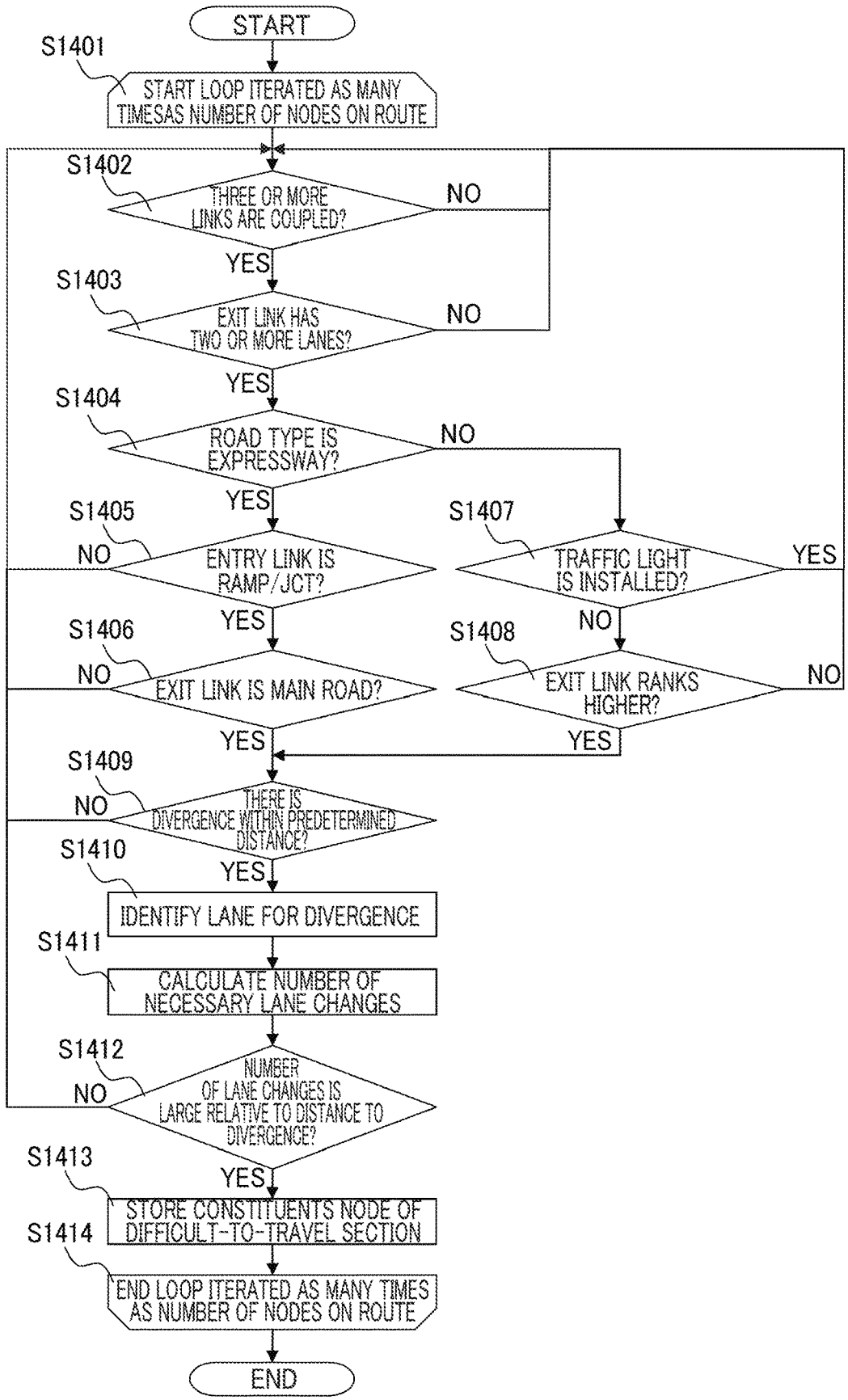
FIG. 5 is a diagram illustrating an example of procedure 1 in a route search method in the first embodiment.

FIG. 4 is a diagram illustrating a situation where a route found by route search includes a difficult-to-travel section R, and FIG. 5 is an example procedure 1 in the route search method according to the present embodiment. With reference to FIGS. 4 and 5, a description is given of processing to detect the difficult-to-travel section R from the found route.

Assume that the host vehicle is located at a departure point S as illustrated in FIG. 4, and the driver of the host vehicle sets a destination G using the navigation device 200. Then, the navigation device 200 starts route search using Dijkstra's algorithm. By Dijkstra's algorithm, a navigation system cycles through processing to determine a node with the smallest cost from the departure point among undetermined nodes and update the costs of neighboring nodes of the node thus determined.

In the above-described processing to settle a node, the navigation device 200 registers the cost for reaching that node from the departure point S and also registers the previous node of that node. For example, to determine a node b in FIG. 4, the navigation device 200 registers its previous node e, and to determine a node d, the navigation device 200 registers its previous node c.

The navigation device 200 ends the processing once the destination G is reached (i.e., once the cost of the node G is updated) by cycling the above processing procedure. Then, the navigation device 200 sequentially traces back from the node G to the previous nodes registered upon being determined, namely, G->k->d->c->b->e->S, and then restructures the nodes reversely to create a route X (S->e->b->c->d->k->G). In is assumed in this example that a section e->b->c->d->k is the difficult-to-travel section R.

Based on FIG. 5, a description is given of a procedure in which the navigation device 200 detects the difficult-to-travel section R in the route X thus found.

In this case, the route search unit 232 of the navigation device 200 starts a loop of S1402 to S1413 iterated as many times as the number of nodes constituting the route X (which is seven (S, e, b, c, d, k, and G) in the case of the route X), or in other words, performs processing of S1402 to S1413 for each node (S1401).

Next, the route search unit 232 of the navigation device 200 determines whether three or more links are coupled to a given node targeted in the current iteration (S1402). This determination is executed because a point of mergence usually has three or more roads coupled to it. Note that this determination uses information that the map data 241 has in relation to each node and link (hereinafter, the same applies to the determinations to be executed).

If it is determined that three or more links are not coupled to the target node (S1402: No), the route search unit 232 of the navigation device 200 proceeds to process the next node.

On the other hand, if it is determined that three or more links are coupled to the target node (S1402: Yes), the route search unit 232 of the navigation device 200 determines whether the exit link of the target node is a road with two or more lanes in each direction (S1403).

If it is determined that the exit link of the target node is not a road with two or more lanes in each direction (S1403: No), the route search unit 232 of the navigation device 200 proceeds to process the next node.

On the other hand, if it is determined that the exit link of the target node is a road with two or more lanes in each direction (S1403: Yes), the route search unit 232 of the navigation device 200 determines whether the road type of the exit link of the target node is an expressway or a local road (S1404). The determination is executed because the structure of a difficult-to-travel section is different depending on whether the road type of the exit link is an expressway or a local road.

If it is determined that the road type of the exit link of the target node is an expressway (S1404: Yes), the route search unit 232 of the navigation device 200 determines whether the link type of the entry link of the target node is either a ramp or a junction (JCT) (also called a crossover) (S1405), and if so, determines whether the link type of the exit link of the target node is a main road (S1406).

If the determination result of S1405 or S1406 is No, i.e., if the link type of the entry link is neither a ramp nor a JCT or if the link type of the exit link is not a main road, the route search unit 232 of the navigation device 200 proceeds to process the next node.

On the other hand, if the determination results of S1405 and S1406 are both Yes, i.e., if the link type of the entry link is either a ramp or a JOT and if the link type of the exit link is a main road, the route search unit 232 of the navigation device 200 determines that the target node is a mergence point.

Meanwhile, if it is determined in S1404 above that the road type of the exit link of the target node is a local road (S1404: No), the route search unit 232 of the navigation device 200 determines whether a traffic light is installed at the target node (S1407), and if not, determines whether the road type of the exit link of the target node ranks higher (is wider) than the road type of the entry link of the target node (such as a highway) (S1408).

If it is determined in S1407 that a traffic light is installed at the target node (S1407: Yes) or if it is determined in S1408 that the road type of the exit link does not rank higher than the road type of the entry link (S1408: No), the route search unit 232 of the navigation device 200 proceeds to process the next node.

On the other hand, if it is determined in S1407 that no traffic light is installed at the target node (S1407: No) or if it is determined in S1408 that the road type of the exit link ranks higher than the road type of the entry link (S1408: Yes), the route search unit 232 of the navigation device 200 determines that the target node is a mergence point.

Next, the route search unit 232 of the navigation device 200 determines whether there is a divergence point including a right or left turn within a predetermined distance on the route from the mergence point identified by the above-described determinations (S1409).

If it is determined that there is no point of divergence including a right or left turn within the predetermined distance on the route from the mergence point (S1409: No), the route search unit 232 of the navigation device 200 proceeds to process the next node. On the other hand, if it is determined that there is a divergence point including a right or left turn within the predetermined distance on the route from the mergence point (S1409: Yes), the route search unit 232 of the navigation device 200 identifies the position of the lane corresponding to the mergence point (S1410), and calculates the number of lane changes necessary from the mergence to the divergence (S1411).

Next, the route search unit 232 of the navigation device 200 determines whether the number of lane changes relative to the distance from the mergence to the divergence is larger than a predetermined standard (S1412). Specifically, the route search unit 232 of the navigation device 200 determines whether a value (k/d) (e.g., 4) obtained by dividing the number of lane changes k (e.g., 2) by the distance d (e.g., 0.5 km) from the mergence to the divergence is larger than a predetermined threshold (e.g., 2).

If it is determined that the number of lane changes relative to the distance from the mergence to the divergence is smaller than the predetermined standard (S1412: No), i.e., that the number of lane changes per distance is smaller than or equal to a threshold, the route search unit 232 of the navigation device 200 determines that it is not difficult to travel the route and proceeds to process the next node.

On the other hand, if it is determined that the number of lane changes relative to the distance from the mergence to the divergence is larger than the predetermined standard (S1412: Yes), the route search unit 232 of the navigation device 200 determines that the route includes a difficult-to-travel section having the target node as a mergence point, and stores the nodes forming the difficult-to-travel section R (namely the nodes e, b, c, d, and k in FIG. 4) in the storage device 201 (S1413).

Figure 6:
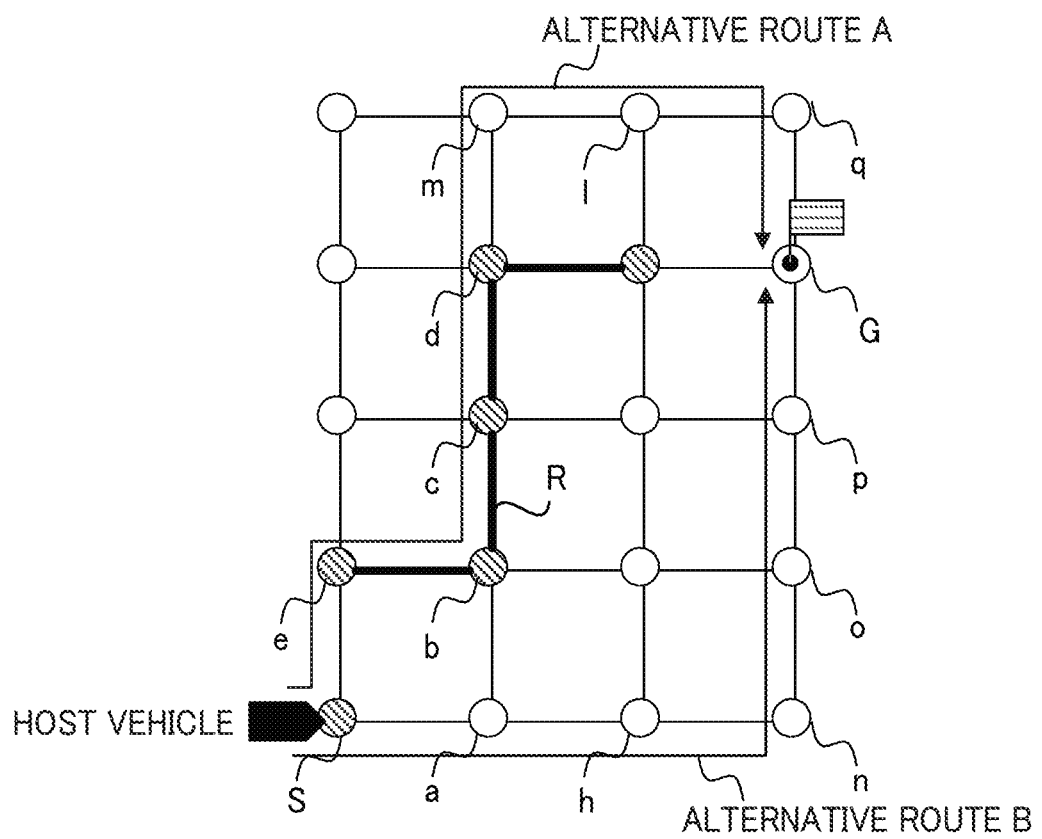
FIG. 6 is a diagram illustrating examples of an alternative route that can be presented by a conventional technology.
Figure 7:
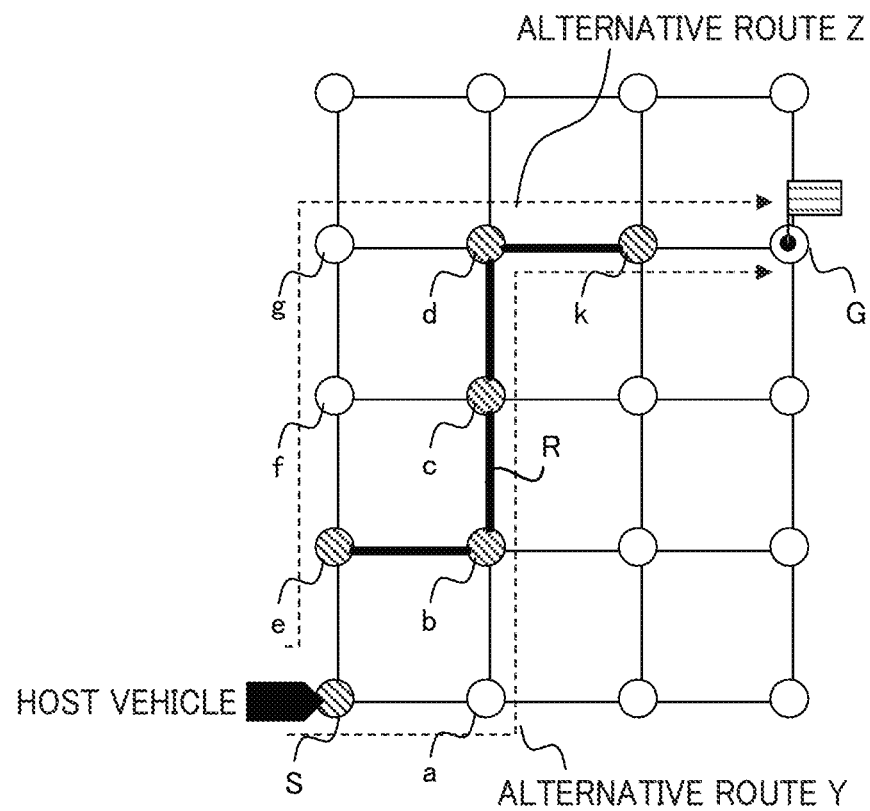
FIG. 7 is a diagram illustrating examples of an alternative route that cannot be presented by a conventional technology.

As shown by FIGS. 6 and 7, a next description relates to an alternative route presentable to the driver as a result of avoiding the route X along which the vehicle has to pass the above-described difficult-to-travel section R.

Of these drawings, FIG. 6 illustrates examples of an alternative route that is able to presentation by a conventional technology. As a method for avoiding the route X in FIG. 4 and obtaining an alternative route when the route X includes the difficult-to-travel section R, there is a method of resuming route search from the state immediately after the route X reaches the destination G. This enables undetermined nodes to be determined and costs to be updated, and therefore routes such as an alternative route A that passes part of the difficult-to-travel section R and reaches the destination G from a node q and an alternative route B that does not pass the difficult-to-travel section R at all and reaches the destination G from a node p are presentable.

On the other hand, FIG. 7, illustrates example alternative route that is not able to presentation by a conventional technology. While the alternative route A and the alternative route B in FIG. 6 are presentable by resumption of search, an alternative route Y or an alternative route Z in FIG. 7 is not presentable. This is because the processing to determine a certain node in Dijkstra's algorithm described earlier involves registration of the previous node of the certain node.

For instance, when the node b is determined, its previous node e is registered. Thus, the alternative route Y reaching the node b from the node a is not presentable. Further, when the node d is determined, its previous node c is registered. Thus, the alternative route Z reaching the node d from the node g is not presentable. The present invention is capable of presenting routes not presentable with the convention technology, which are exemplified in FIG. 7 as the alternative route Y and the alternative route Z, and of obtaining an increased variety of candidate routes to possibly be an alternative route presented as a result of avoiding a route including a difficult-to-travel section, thus improving the quality of the alternative route.

Figure 8A:
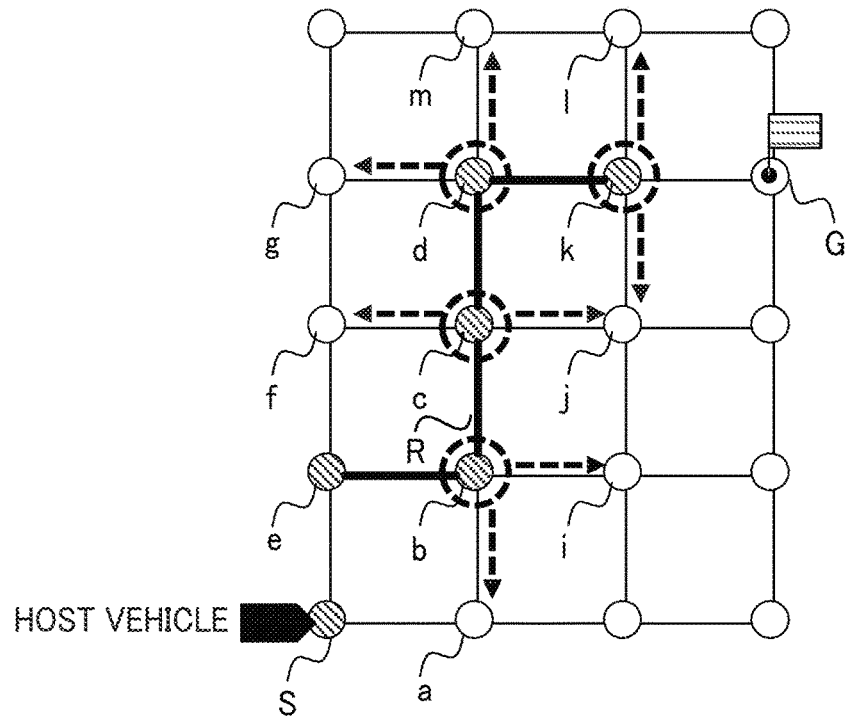
FIG. 8A is a diagram illustrating a procedure of adding a candidate route in the first embodiment.
Figure 8B:
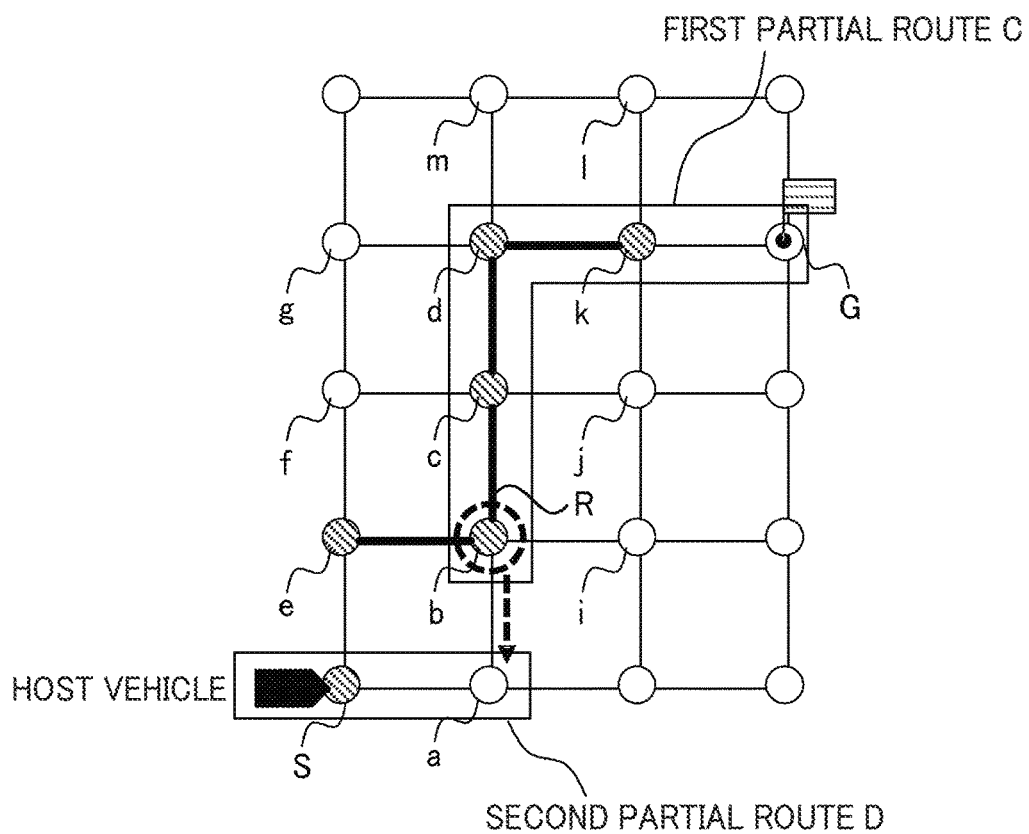
FIG. 8B is a diagram illustrating a procedure of adding a candidate route in the first embodiment.
Figure 9:
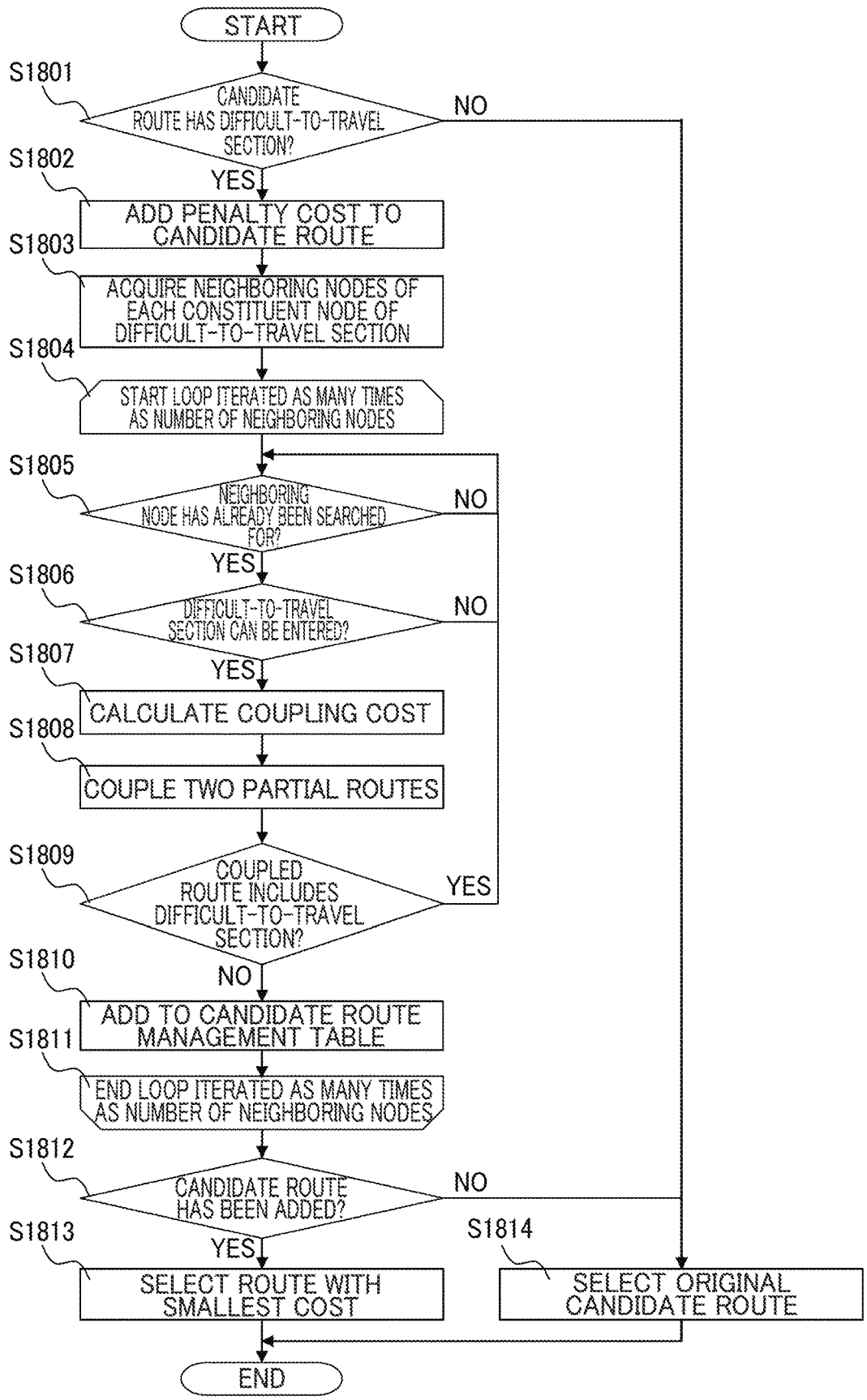
FIG. 9 is a diagram illustrating an example procedure 2 in the route search method according to the first embodiment.

As shown by FIGS. 8A, 8B, and 9, a next description relates to procedures of route candidate addition processing and route selection processing. First, the route search unit 232 of the navigation device 200 determines whether the candidate route obtained by the procedure in FIG. 5 includes a difficult-to-travel section, and constituent nodes of the difficult-to-travel section are stored in the storage device 201 (S1801). Note that the difficult-to-travel section targeted by this determination is the one identified by the procedure in FIG. 5.

If it is determined that the candidate route does not include a difficult-to-travel section (S1801: No), the route search unit 232 of the navigation device 200 selects this candidate route including no difficult-to-travel section as a guidance route (S1814), and ends the processing.

On the other hand, if it is determined that the candidate route includes a difficult-to-travel section and nodes constituting the difficult-to-travel section are stored in the storage device 201 (S1801: Yes), the route search unit 232 of the navigation device 200 adds a penalty cost to the candidate route (a penalty cost is for example an amount of time required or a charge payable to use a toll road and is a predetermined value determined beforehand according to how hard it is to travel the route, such as the number of lane changes per distance) (S1802). This makes it unlikely for the original candidate route including a difficult-to-travel section to be selected as a guidance route.

Next, the route search unit 232 of the navigation device 200 acquires information on neighboring nodes of each constituent node of the difficult-to-travel section (S1803). Specifically, for the constituent nodes of the difficult-to-travel section illustrated in FIGS. 8A and 8B, the route search unit 232 of the navigation device 200 acquires information on nodes a and i that neighbor the constituent node b, information on nodes f and j that neighbor the constituent node c, information on nodes g and m that neighbor the constituent node d, and information on nodes j and l that neighbor the constituent node k.

In this step, the route search unit 232 of the navigation device 200 does not acquire information on the neighboring nodes of the node e, which is the first node of the difficult-to-travel section. This is because a candidate route to be added always ends up including the difficult-to-travel section if the first node of the difficult-to-travel section is included. For the same reason, if a certain node that neighbors a constituent node of the difficult-to-travel section is another constituent node of the difficult-to-travel section, the route search unit 232 of the navigation device 200 does not acquire information on such a neighboring node. For example, the route search unit 232 of the navigation device 200 does not acquire information on the nodes c and d that respectively neighbor the constituent nodes b and k of the difficult-to-travel section.

Thereafter, the route search unit 232 of the navigation device 200 iterates processing of S1804 to S1810 for each of the neighboring nodes described above (seven in the example of FIGS. 8A and 8B) (S1804 to S1811).

In this loop, the route search unit 232 of the navigation device 200 determines whether a neighboring node targeted in the current iteration has already been searched for (S1805). Here, a node which has "already been searched for" means a node whose cost has been updated even once until route search is over, and it does not matter whether the node has been determined or undetermined.

If it is determined that the target neighboring node has not been searched for yet (S1805: No), the route search unit 232 of the navigation device 200 proceeds to process the next neighboring node.

On the other hand, if the target neighboring node has already been searched for (S1805: Yes), the route search unit 232 of the navigation device 200 determines whether it is possible to enter the difficult-to-travel section from the target neighboring node (S1806). For example, in FIG. 8, the route search unit 232 of the navigation device 200 determines whether it is possible to enter the node b from the node a, which neighbors a constituent node of the difficult-to-travel section R. Reasons for not being able to enter the difficult-to-travel section includes traffic regulations such as one-way traffic and no right or left turn.

On the other hand, if it is determined that it is not possible to enter the difficult-to-travel section R from the target neighboring node (S1806: No), the route search unit 232 of the navigation device 200 proceeds to process the next neighboring node.

On the other hand, if it is determined that it is possible to enter the difficult-to-travel section R from the target neighboring node (S1806: Yes), the route search unit 232 of the navigation device 200 calculates the cost of entering the difficult-to-travel section R from the target neighboring node of a certain constituent node of the difficult-to-travel section R, i.e., a coupling cost (S1807). In the example of FIGS. 8A and 8B, this cost is the cost of going from the node a to the node b.

Next, the route search unit 232 of the navigation device 200 couples a partial route extending from the certain constituent node of the difficult-to-travel section R to the destination G with a partial route extending from the departure point S to the node that has already been searched for and that neighbors the certain constituent node of the difficult-to-travel section R (S1808).

In the example of FIG. 8, for example, the route search unit 232 of the navigation device 200 couples a first partial route C extending from the node b of the difficult-to-travel section R to the destination G via the nodes c, d, and k with a second partial route D extending from the departure point S to the node a, thereby creating a candidate route that reaches the destination in the order of S–>a–>b–>c–>d–>k–>G.

The cost sum of the coupled candidate route is (the cost of the first partial route C)+(the cost of the second partial route D)+(coupling cost). Several items are conceivable as to what to take into consideration for the calculation of the coupling cost. Only the cost of the link between the nodes a and b may be the couple cost, or an angular cost of the mergence into the node a may be taken into consideration (e.g., cost such as time determined beforehand according to the size of an included angle formed when the route extends from the departure point S and merges into a link between the node a and the node b at the node a, the included angle being formed by the travelling direction of the vehicle and the direction of the corresponding lane). Furthermore, the cost calculated for the node c of the original candidate route includes the angular cost of mergence from the node e to the node b, and therefore the difference between this angular cost and the angular cost of passing the node b from the node a in the coupled candidate route may be taken into consideration.

Next, the route search unit 232 of the navigation device 200 determines whether the candidate route obtained by the coupling processing in S1808 includes a difficult-to-travel section (S1809). This determination processing is the same as that in the procedure in FIG. 5, and is therefore not described again here.

If it is determined that the candidate route obtained by the coupling processing includes a difficult-to-travel section (S1809: Yes), the route search unit 232 of the navigation device 200 does not add the candidate route as a candidate route, and proceeds to process the next neighboring node.

On the other hand, if it is determined that the candidate route obtained by the coupling processing does not include a difficult-to-travel section (S1809: No), the route search unit 232 of the navigation device 200 adds the candidate route obtained by the coupling processing in S1808 to the candidate route management table 242 (see FIG. 10, to be described later) (S1810).

After iterating the processing of S1804 to S1810 as many times as the number of the neighboring nodes, the route search unit 232 of the navigation device 200 determines whether there is any candidate route added to the candidate route management table 242 (S1812).

If it is determined that there is no candidate route added to the candidate route management table 242 (S1812: No), the route guidance unit 233 of the navigation device 200 selects the original candidate route including a difficult-to-travel section as a guidance route (S1814) since it is the only candidate route found, and ends the processing.

On the other hand, if it is determined that there is any candidate route added to the candidate route management table 242 (S1812: Yes), the route guidance unit 233 of the navigation device 200 selects a candidate route having the smallest cost in the candidate route management table 242 as a guidance route, outputs information on this route using the display unit 211 and/or the voice message output unit 212 (S1813), and ends the procedure.

By the procedure described above, the alternative routes Y and Z exemplified in FIG. 7 may be added as candidate routes, and if any of these has the smallest cost, the candidate route may be presented to the driver (or a user) as a guidance route.

Note that the procedure of the candidate route addition processing is not limited to the one described above. For example, in FIG. 9, neighboring nodes of each constituent node of a difficult-to-travel section are acquired, and it is determined whether the neighboring nodes have already been searched for. Instead, nodes targeted by the determination may be extended to two or more nodes from each constituent node of the difficult-to-travel section. In this case, cost of extending over a plurality of links needs to be considered as a coupling cost.

Next, the candidate route management table 242 mentioned above is described with reference to FIG. 10. The candidate route management table 242 is a table for managing an original candidate route which reaches the destination fastest and candidate routes added in the procedure of FIG. 9 (see S1810 in FIG. 9).

The candidate route management table 242 includes a candidate route ID 901, a cost 902, a difficult-to-travel section passage flag 903, a route length 904, an autonomous driving section length 905, an on-route link count 906, and an on-route link ID sequence 907.

Of these, the candidate route ID 901 is a number for uniquely identifying a candidate route among a plurality of candidate routes. The cost 902 is the cost sum of the corresponding candidate route. The cost sum of a candidate route set in the cost 902 is the cost obtained after the addition of a penalty cost if the candidate route includes a difficult-to-travel section, and is the sum of the costs of two partial routes and a coupling cost if the candidate route is the one added in the procedure of FIG. 9.

In the difficult-to-travel section passage flag 903, "1" is set if the corresponding candidate route includes a difficult-to-travel section, and otherwise, "0" is set. The route length 904 is the sum of the lengths of the links of the corresponding candidate route from the departure point to the destination.

The autonomous driving section length 905 is the length of a section in the corresponding candidate route where autonomous driving is possible. It is expected that autonomous driving starts after the vehicle enters an expressway. Thus, the length set in the autonomous driving section length 905 may be the sum of the lengths of links whose road type is expressway within the candidate route, or if each link stored in the map data 241 in FIG. 1 has information indicating whether autonomous driving is possible on that link, the sum of the lengths of the links in the candidate route having information indicating that autonomous driving is possible.

The on-route link count 906 is the number of links constituting the corresponding candidate route. The on-route link ID sequence 907 is a sequence of IDs identifying the links constituting the corresponding candidate route. Although the candidate route management table 242 has been described above, the present invention is not limited to the table structure described above. For example, the table may include information identifying a mesh (a management unit of map data) where on-route links exist, or additionally include the directions or attributes of the links.

Figure 11A:
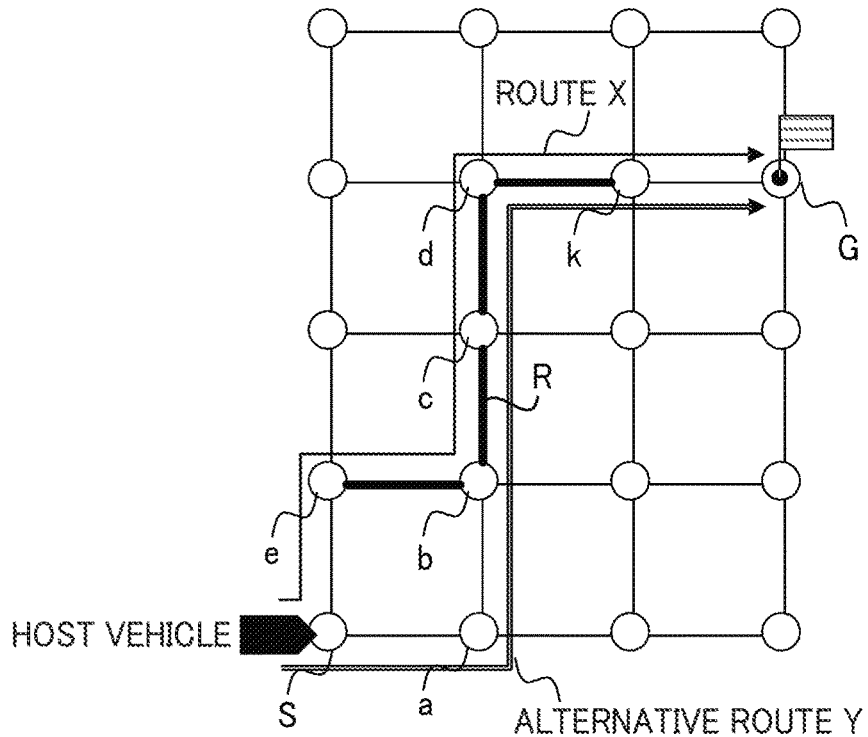
FIG. 11A is a diagram illustrating an example of how to present a candidate route including a difficult-to-travel section and an alternative route.
Figure 11B:
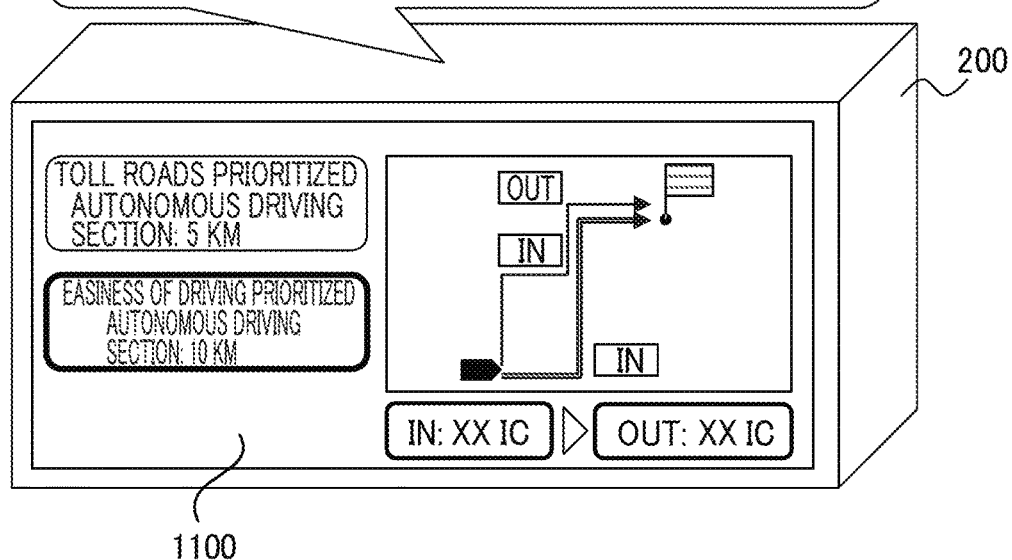
FIG. 11B is a diagram illustrating an example of how to present a candidate route including a difficult-to-travel section and an alternative route.

As shown by FIGS. 11A and 11B, a next description relates to how a candidate route including a difficult-to-travel section R and its alternative route are presented. When a candidate route including a difficult-to-travel section R and an additional candidate route are obtained as a result of the route search and candidate route addition processing, the difference in the cost sum between these candidate routes may be very small.

In such a case, the route guidance unit 233 of the navigation device 200 may present more than one candidate route to the user by using the display unit 211 and/or the voice message output unit 212 so that the user can select a guidance route that they would like.

For instance, as illustrated in FIG. 11A, assume that a route X which is a candidate route including a difficult-to-travel section R and an alternative route Y which is an additional candidate route are obtained. Also assume the following: the nodes a, b, and c are interchanges (IC) on an expressway; the route X gets on the expressway at the IC of the node b and gets off the expressway at the IC of the node d; and the alternative route Y gets on the expressway at the IC of the node a and gets off the expressway at the IC of the node d.

The present invention is characterized by being capable of presenting an alternative route which is changed before the difficult-to-travel section R (closer to the departure point), and therefore is capable of presenting a route that "gets on the expressway at the previous IC".

In such a case, if the cost sums of the route X and the alternative route Y are not different so much from each other, the route guidance unit 233 of the navigation device 200 presents a result of comparison between these routes to the driver by outputting a screen 1100 or a voice message using the output unit 210, as illustrated in FIG. 11B. The route X is a candidate route under "toll roads prioritized", and the alternative route Y is a candidate route under "easiness of driving prioritized". The screen 1100 in this scenario shows information such as the autonomous driving section and ICs for getting on and off for each candidate route, and the voice message tells the reason for presenting the alternative route Y which is "lane change can be done with more time". When a candidate route added by the present invention is presented to the user with the reason for the addition, the user can select a guidance route that they would like according to, for example, their driving technology or preference.

Second Embodiment

Figure 12:
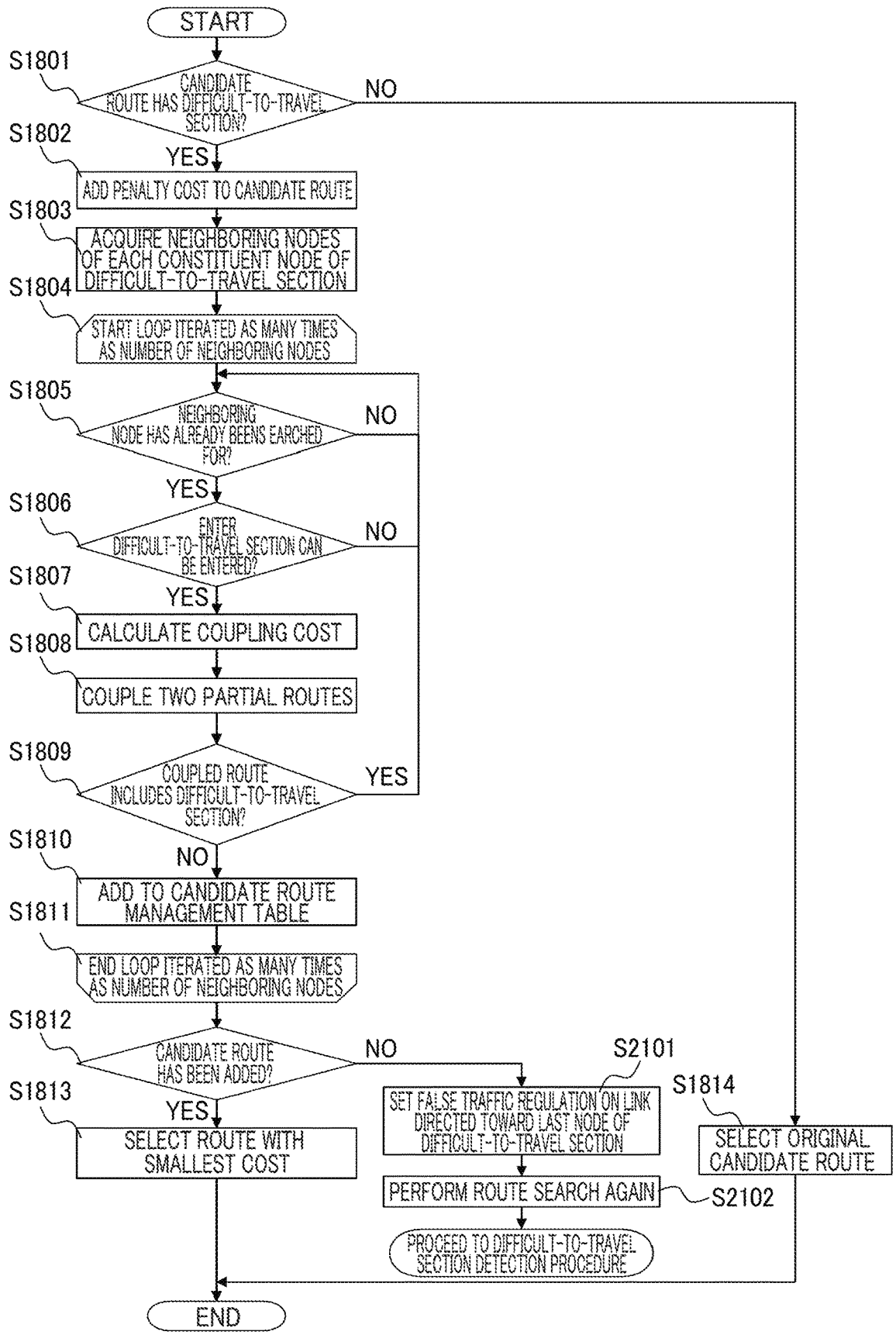
FIG. 12 is a diagram illustrating an example procedure in a route search method in the second embodiment.

When no additional candidate route is found in the procedure illustrated in FIG. 9, i.e., when only a candidate route including a difficult-to-travel section is identified, re-search is performed to avoid the route including the difficult-to-travel section from being presented as a guidance route. The following describes processing performed for this re-search based on FIG. 12. The steps which are the same as those in the flowchart of FIG. 9 are denoted by the same reference signs and are not described below. Here, the description is given starting from the determination step in S1812.

When it is determined in S1812 that there is no candidate route added to the candidate route management table 242 (S1812: No), the route search unit 232 of the navigation device 200 sets a false traffic regulation to the link directed toward the last node of the difficult-to-travel section (S2101). Specifically, the route search unit 232 of the navigation device 200 sets a traffic regulation (e.g., road-closed information) to the link directed from the node d to the node k in FIG. 4. This causes the costs of the node d to the node k not to be updated when re-search is performed, consequently allowing a route to include no difficult-to-travel section.

Next, the route search unit 232 of the navigation device 200 performs re-search of a route from the departure point S to the destination G (S2102), stops the processing once the cost of the node of the destination G is updated, and proceeds to the procedure for detecting a difficult-to-travel section (see FIG. 5). The reason for redoing the detection of a difficult-to-travel section is because the route obtained by the re-search is prevented by the false traffic regulation set in S2101 from including the difficult-to-travel section detected in the route obtained by the first search, but might include a different difficult-to-travel. If the route obtained by the re-search still includes a difficult-to-travel section, the route search unit 232 of the navigation device 200 proceeds to the procedure for adding a candidate route (see FIG. 9). The present embodiment described above makes it more unlikely that a route including a difficult-to-travel section is selected as a guidance route, and as a result, enables the user to travel a guidance route with which the user feels safer and more comfortable.

Third Embodiment

The third embodiment presents a configuration in which in place of the navigation device 200 a route search server 400 performs route search and transmits the obtained route information to the navigation device 200. It is advantageous to perform route search with the route search server 400 which, for example, frequently updates electronic map and retains up-to-date traffic information provided by road administrators or the like, because then latest traffic information and map data 431 can be used for the route search. This configuration also reduces processing load on the navigation device 200.

Figure 13:
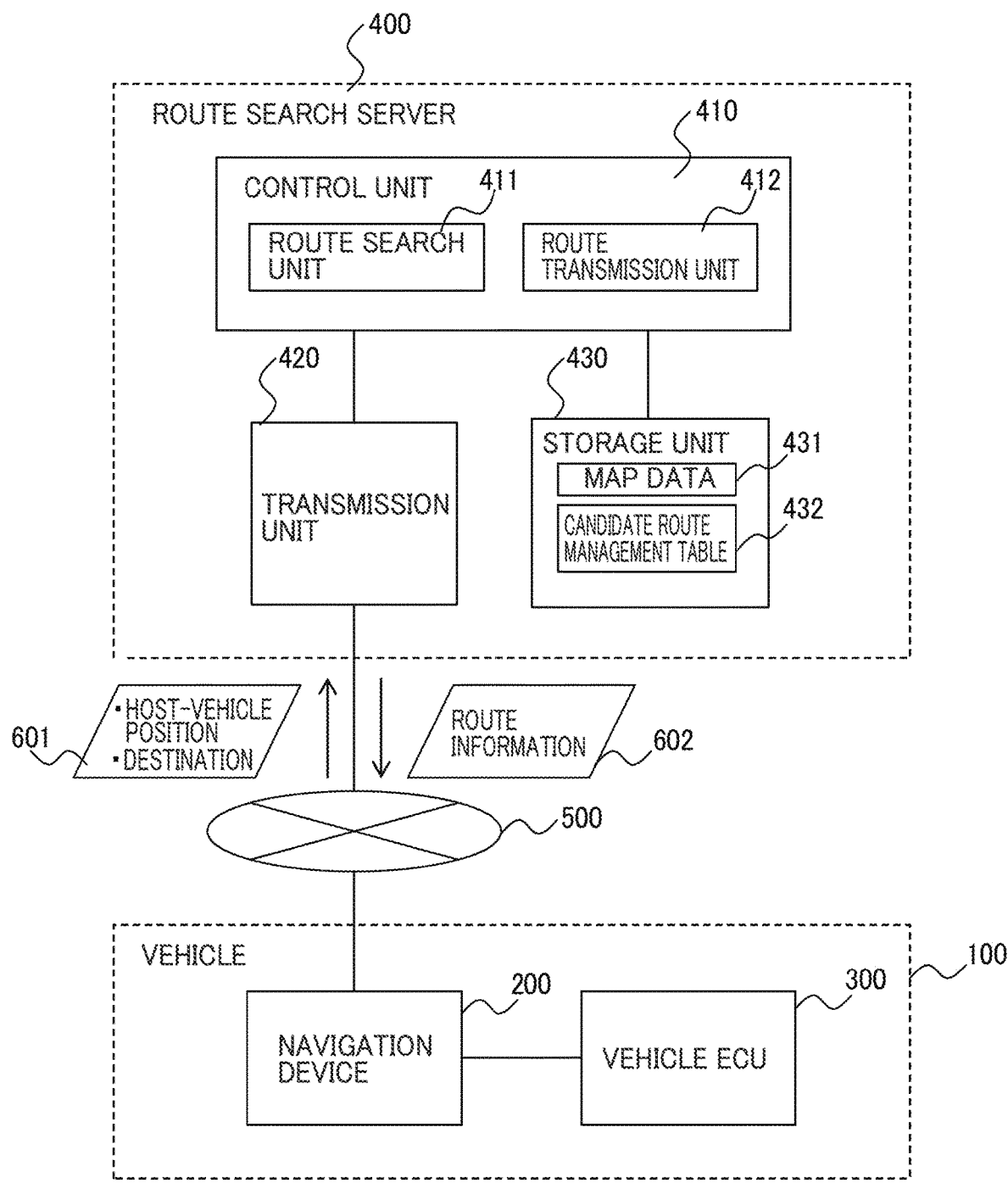
FIG. 13 is a diagram illustrating an example system configuration in the third embodiment.
Figure 14:
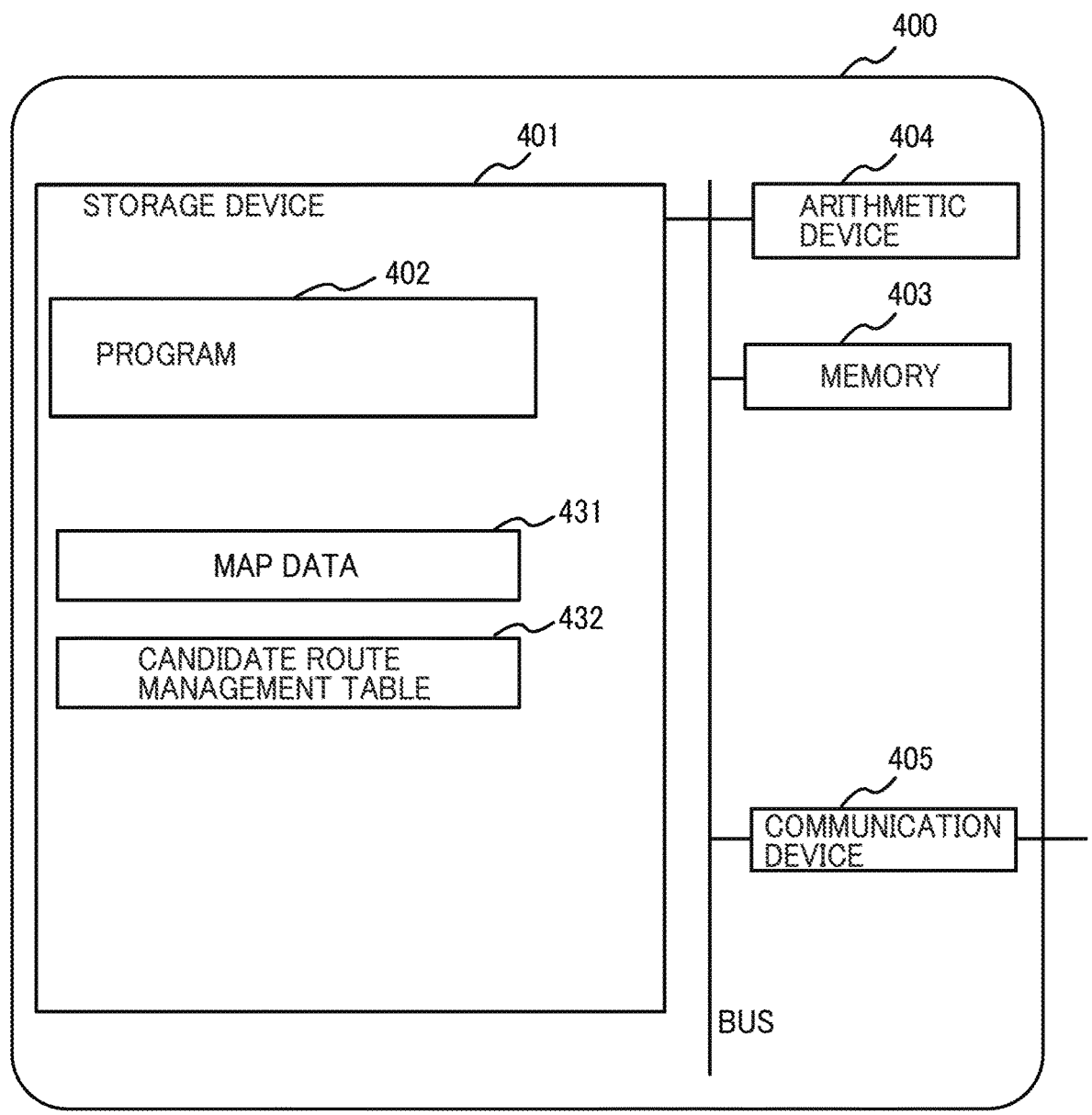
FIG. 14 is a diagram illustrating an example configuration of a route search server in the third embodiment.

With reference to FIGS. 13 and 14, a description is given of the route search server 400 according to the present embodiment. This route search server 400 includes a control unit 410, a communication unit 420, and a storage unit 430. The hardware configuration of the route search server 400 includes a storage device 401 that stores therein, for example, a program 402 for implementing necessary functions, a memory 403, an arithmetic device 404, and a communication device 405. The route search server 400 may also include an input device and an output device, but these are not essential constituents since the route search server 400 is a server device. The storage device 401 stores therein map data 431 and a route candidate management table 432 like the navigation device 200 of the first embodiment and the second embodiment.

The navigation device 200 in the present embodiment transmits the host-vehicle location of the vehicle 100 and destination information 601 set by the driver to the route search server 400 over an appropriate communication network 500 such as a mobile phone network.

Meanwhile, in the route search server 400, when the communication unit 420 receives the host-vehicle position and the destination information 601 transmitted from the navigation device 200, a route search unit 411 performs route search using map data 431. Note that the difficult-to-travel section detection processing (see FIG. 5) and the candidate route addition processing (see FIG. 9) carried out after the route search are performed following the same procedures followed by the navigation device 200 described above. For this reason, descriptions for the detection processing and the addition processing are omitted.

Once a guidance route is selected, a route transmission unit 412 of the route search server 400 transmits route information 602 on the guidance route to the navigation device 200. The navigation device 200 causes the output unit 210 to output the route information 602 thus received from the route search server 400 as a guidance route, thus performing route guidance.

If the route search yields a plurality of candidate routes whose costs are not different so much from each other, the route transmission unit 412 of the route search server 400 may transmit the plurality of candidate routes to the navigation device 200 as the route information 602. Then, the route guidance unit 233 of the navigation device 200 presents the plurality of candidate routes to the driver (or the user) by the guidance method illustrated in FIG. 11B. Further, if the vehicle 100 is capable of autonomously driving a set route, the route transmission unit 234 of the navigation device 200 may transmit the route information to the vehicle ECU 300 to use the route information for vehicle control. Note that the data format of the route information 602 may be the same as or different from that of the candidate route management table illustrated in FIG. 10.

Although best modes for carrying out the present invention and the like have been described above in concrete terms, the present invention is not limited to them and is variously modifiable without departing from the gist thereof. For example, there may be a case where the destination is not determined at a single point at the start of route search, and the search continues until the costs of nodes in the search area can no longer be updated. The present invention is applicable to such a case as well because a candidate route from a departure point to a destination can be established if a certain node reached by the end of the search is focused and regarded as the destination.

The present embodiments select a candidate route with the smallest cost after obtaining an increased variety of candidate routes which may be an alternative route of a route including a difficult-to-travel section, and therefore improves the quality of a guidance route presented as a result. In other words, the present invention performs route guidance that excludes a difficult-to-travel section appropriately and presents an alternative route with favorable route quality.

The descriptions herein provide at least the following. Specifically, the navigation device of the present embodiments may be such that when the alternative route includes a difficult-to-travel section, the route search unit rejects the alternative route as the second candidate route.

This enables avoidance of a situation where a route including a difficult-to-travel section is suggested as an alternative route.

Further, the navigation device of the present embodiments may be such that when the alternative route has a traffic regulation between the second node and the first node in the difficult-to-travel section, the route search unit rejects the alternative route as the second candidate route.

This enables avoidance of a situation where a route including a section where vehicles cannot pass due to a traffic regulation is suggested as an alternative route.

Further, the navigation device of the present embodiments may further comprise: an output unit; and a route guidance unit that, when a difference between the costs of the first candidate route and the second candidate route is smaller than a predetermined value, outputs to the output unit information on both the first candidate route and the second candidate route and information indicating that it is easier to travel the second candidate route than the first candidate route.

This enables provision of an interface which may leave it up to the user to select a guidance route when a route including a difficult-to-travel section and an alternative route including no difficult-to-travel section are different from each other only slightly in time and monetary cost required. This way, the user can be explicitly informed that there is a candidate route including no difficult-to-travel section.

Further, the navigation device of the present embodiments may be such that when the first candidate route is an only candidate route identified, the route search unit sets a false traffic regulation on the first candidate route or at a predetermined location in a vicinity of the first candidate route, and then performs the route search again.

This ensures avoidance of a situation where the user has no choice but to select a route including a difficult-to-travel section.

Further, the route search method of the present embodiments may be such that when the alternative route includes a difficult-to-travel section, the navigation device rejects the alternative route as the second candidate route.

Further, the route search method of the present embodiments may be such that when the alternative route has a traffic regulation between the second node and the first node in the difficult-to-travel section, the navigation device rejects the alternative route as the second candidate route.

Further, the route search method of the present embodiments may be such that the navigation device includes an output unit, and when a difference between the costs of the first candidate route and the second candidate route is smaller than a predetermined value, the navigation device outputs to the output unit information on both the first candidate route and the second candidate route and information indicating that it is easier to travel the second candidate route than the first candidate route.

Further, the route search method of the present embodiments may be such that when the first candidate route is an only candidate route identified, the navigation device sets a false traffic regulation on the first candidate route or at a predetermined location in a vicinity of the first candidate route, and then performs the route search again.

What is claimed is:

1. A navigation device that performs route search to find candidate routes each having a plurality of nodes from a departure point to a destination, manages costs of the respective candidate routes, and selects a guidance route from the candidate routes based on the costs, the navigation device comprising:
    a processor configured to:
        manage, when a first candidate route including an avoid-to-travel section is found, as the cost of the first candidate route, a sum of a predetermined penalty cost and an original cost of the first candidate route,
        identify, as a second candidate route, an alternative route obtained by coupling a first partial route with a second partial route, the first partial route extending from a first node in the avoid-to-travel section included in the first candidate route to the destination, the second candidate route extending from the departure point of the first candidate route to a second node which neighbors the first node,
        manage, as the cost of the second candidate route, a sum of a cost of the first partial route, a cost of the second partial route, and a coupling cost which is a cost for coupling the first partial route with the second partial route, and
        compare the cost of the first candidate route with the cost of the second candidate route, and select one of the first and second candidate routes with the smaller cost as the guidance route.

2. The navigation device according to claim 1, wherein when the alternative route includes an avoid-to-travel section, the processor rejects the alternative route as the second candidate route.

3. The navigation device according to claim 1, wherein when the alternative route has a traffic regulation between the second node and the first node in the avoid-to-travel section, the processor rejects the alternative route as the second candidate route.

4. The navigation device according to claim 1, further comprising:
    an output device comprising a display, and
    wherein the processor is further configured to output, when a difference between the costs of the first candidate route and the second candidate route is smaller than a predetermined value, to the output device information on both the first candidate route and the second candidate route and information indicating that it is easier to travel the second candidate route than the first candidate route.

5. The navigation device according to claim 1, wherein when the first candidate route is an only candidate route identified, the processor sets a false traffic regulation on the first candidate route or at a predetermined location in a vicinity of the first candidate route, and then performs the route search again.

6. A route search method performed by a navigation device that performs route search to find candidate routes each having a plurality of nodes from a departure point to a destination, manages costs of the respective candidate routes, and selects a guidance route from the candidate routes based on the costs, the route search method comprising:

managing, when a first candidate route including an avoid-to-travel section is found, as the cost of the first candidate route, a sum of a predetermined penalty cost and the original cost of the first candidate route;

identifying, as a second candidate route, an alternative route obtained by coupling a first partial route with a second partial route, the first partial route extending from a first node in the avoid-to-travel section included in the first candidate route to the destination, the second candidate route extending from the departure point of the first candidate route to a second node which neighbors the first node;

managing, as the cost of the second candidate route, a sum of a cost of the first partial route, a cost of the second partial route, and a coupling cost which is a cost for coupling the first partial route with the second partial route; and comparing the cost of the first candidate route with the cost of the second candidate route and selecting one of the first and second candidate routes with the smaller cost as the guidance route.

7. The route search method according to claim 6, wherein when the alternative route includes an avoid-to-travel section, the navigation device rejects the alternative route as the second candidate route.

8. The route search method according to claim 6, wherein when the alternative route has a traffic regulation between the second node and the first node in the avoid-to-travel section, the navigation device rejects the alternative route as the second candidate route.

9. The route search method according to claim 6, wherein the navigation device includes an output unit, and when a difference between the costs of the first candidate route and the second candidate route is smaller than a predetermined value, information on both the first candidate route and the second candidate route and information indicating that it is easier to travel the second candidate route than the first candidate route are outputted to the output unit.

10. The route search method according to claim 6, wherein when the first candidate route is an only candidate route identified, the navigation device sets a false traffic regulation on the first candidate route or at a predetermined location in a vicinity of the first candidate route, and then performs the route search again.

\* \* \* \* \*